(12) United States Patent
Edelhaus et al.

(10) Patent No.: US 8,149,827 B1
(45) Date of Patent: Apr. 3, 2012

(54) SYSTEM AND METHOD FOR NETWORK TRANSPORT SERVICE RELYING ON CALL INDUCED TARGETED MEDIA

(75) Inventors: Simon Edelhaus, Sharon, MA (US); Sanal Kumar V K, Bangalore (IN)

(73) Assignee: EnVid Technologies, LLC, Sharon, MA (US)

( * ) Notice: Subject to any disclaimer, the term of this patent is extended or adjusted under 35 U.S.C. 154(b) by 560 days.

(21) Appl. No.: 12/241,575

(22) Filed: Sep. 30, 2008

(51) Int. Cl.
H04L 12/28 (2006.01)

(52) U.S. Cl. ............. 370/389; 379/114.12; 379/114.13; 379/142.17; 704/270

(58) Field of Classification Search .............. 370/389; 379/114.12; 455/412.2; 705/14
See application file for complete search history.

(56) References Cited

U.S. PATENT DOCUMENTS

| | | | |
|---|---|---|---|
| 6,931,114 B1 | 8/2005 | Martin | |
| 7,065,186 B1 | 6/2006 | Myers et al. | |
| 7,251,479 B2 | 7/2007 | Holder et al. | |
| 7,317,716 B1 | 1/2008 | Boni et al. | |
| 7,412,486 B1 | 8/2008 | Petrack et al. | |
| 2002/0029384 A1 | 3/2002 | Griggs | |
| 2002/0053081 A1 | 5/2002 | Griggs | |
| 2002/0095330 A1 | 7/2002 | Berkowitz et al. | |
| 2002/0122429 A1 | 9/2002 | Griggs | |
| 2002/0178054 A1* | 11/2002 | Ader | 705/14 |
| 2003/0046151 A1 | 3/2003 | Abuan et al. | |
| 2003/0149975 A1* | 8/2003 | Eldering et al. | 725/34 |
| 2004/0161089 A1 | 8/2004 | Hanson et al. | |
| 2004/0186909 A1 | 9/2004 | Greenwood et al. | |
| 2005/0022241 A1 | 1/2005 | Griggs | |
| 2005/0198147 A1 | 9/2005 | Pastro et al. | |
| 2005/0259798 A1 | 11/2005 | Yarlagadda et al. | |
| 2006/0259926 A1 | 11/2006 | Scheelke et al. | |
| 2007/0073585 A1* | 3/2007 | Apple et al. | 705/14 |
| 2007/0078709 A1 | 4/2007 | Rajaram | |
| 2007/0097975 A1 | 5/2007 | Rakers et al. | |
| 2007/0174873 A1 | 7/2007 | Griggs | |
| 2007/0189271 A1 | 8/2007 | Borislow et al. | |
| 2007/0201450 A1 | 8/2007 | Borislow et al. | |
| 2007/0230673 A1 | 10/2007 | Hanson et al. | |
| 2007/0274483 A1* | 11/2007 | Shapiro | 379/114.12 |
| 2008/0010132 A1* | 1/2008 | Aaron et al. | 705/14 |
| 2008/0043949 A1 | 2/2008 | Tam | |
| 2008/0077960 A1 | 3/2008 | Griggs | |
| 2008/0152101 A1 | 6/2008 | Griggs | |
| 2009/0203359 A1* | 8/2009 | Makhoul et al. | 455/412.2 |

* cited by examiner

Primary Examiner — Dang Ton
Assistant Examiner — Mohamed Kamara
(74) Attorney, Agent, or Firm — Chapin IP Law, LLC

(57) ABSTRACT

A telecommunication appliance serves a large user base via an interface to a universal registration database having access to a set of transport mediums applicable to each user. A media database operates in conjunction with the appliance for identifying the user and providing targeted media to the user during a connection interval commonly referred to as the "ringback" period while a connection supporting the requested communication is completed. The universal identifier indexes alternate transport mediums available to the user based on entries in the universal database, and determines a lower cost (or no cost) transport. In lieu of the convention ringback, the initiating user receives targeted media referenced from the media database and responds to it while the communication is completed. The targeted media is provided as a fee based service to media provides (advertisers), therefore injecting revenue for supporting the service without requiring a fee from the invoking users. The user identification also enables a slew of value added services such as secure login to various databases and secure billing and payment.

16 Claims, 7 Drawing Sheets

SYSTEM AND METHOD FOR NETWORK TRANSPORT SERVICE RELYING ON CALL INDUCED TARGETED MEDIA

BACKGROUND

The telecommunications industry has seen explosive growth in recent decades, due largely to the proliferation of communication networks supporting digital mediums such as Internet and cellular based platforms. While the technology behind traditional wired phones has remained relatively static for some time, wireless and Internet based communication has seen substantial growth. Various services and devices have evolved to provision technological advances to end users. Therefore, while the conventional Public Switched Telephone Network (PSTN) network persists, newer communication mediums continue to evolve, either layered on top of the existing physical infrastructure or developed in parallel, such as the Internet and related digital mediums.

Despite the growth of each individual communication medium, there is very limited automation between different mediums, such as trends toward a "universal" communication mode. Unfortunately, therefore, many communications mediums exist as islands of technology, with little or no integration into other communication mediums. For example, while sitting at home, one either makes a cellphone call or a conventional wired phone call. Alternatively, a user may elect to send an email from a PC or text a message to a recipient. No integration or automatic crossover between these technologies exists. A user makes an active decision about which technology to invoke, and subsequent manually invokes a second, third medium, etc. to accomplish the communication.

SUMMARY

In a conventional communication scenario, a user makes a conscious decision about which communication medium to invoke to contact a recipient. The user then manually invokes an alternate mechanism if initial attempts are unsuccessful, such as a wired line phone, then mobility (i.e. cellphone), then email or text messaging, for example. Current consumer oriented communication mediums represent isolated islands of technology. Each user must manually identify and select a communication medium through which to reach a recipient. Typically this results in a scenario in which an initiator, for example, calls a work phone number, then calls a cell number, tries a home number, then texts the cell device or leaves a voice mail. Conventional telecommunications providers may provide a service to transfer a voice call to a specified ordering of phone numbers, however such services typically employ a fee for services approach that requires all the phone numbers to be within the service, and only operate on the voice lines of the carrier telecommunications provider. There is no selection of an alternate transport medium nor of an alternate user mode, such a text, chat or email. There is no consolidated repository or universal selector which can identify and apply a communication medium between arbitrary users.

Conventional wired and mobile phones rely on a physical network of interconnections switched and maintained by a service provider, or telephone company. More recently, alternative services employing alternate transport mediums such as the Internet have emerged. Services such as Voice Over IP (VOIP) and Upstream Voice/Chat providers like Skype® employ IP connections for transporting voice, in lieu of conventional telephone lines, sometimes known as "twisted pair" connections. Further, wireless communication devices have experienced explosive growth in recent years. This so-called "mobility" network provides another transport medium over conventional Public Switched Telephone Network (PSTN) lines.

Alternatives to PSTN call service such as mobility and VOIP are typically fee based services in which a subscriber (user) pays a fee (although typical land-line alternatives such as VOIP tend to undercut PSTN providers) for completing a communication. VOIP providers, for example, typically provide a subscriber with an interface box disposed in the subscriber's residence or business receiving and redirecting would-be PSTN calls from wired handsets. Other mediums, such as Upstream Voice/Chat networks clients, are invokable by a knowledgeable user via the Internet using an already established Internet gateway, in effect "for free."

A particular shortcoming of these alternatives is the above mentioned need for a fee based subscription and local interface device specific to the user (i.e. connected to the home or business phone line). Therefore, conventional deployment has been highly granular on a per user/household basis and provides only marginal cost savings over conventional PSTN and Mobility services. Configurations disclosed herein substantially overcome the shortcomings of highly granular deployment by providing a central appliance serving a large user base via an interface to a universal registration database having access to a set of transport mediums applicable to each user. A media database operates in conjunction with the central appliance for identifying the user and providing targeted media to the user during a connection interval commonly referred to as the "ringback" period while a connection supporting the requested communication is completed. Such targeted media supports revenue generation for the service, similar to the manner in which web pages, in effect "free" for a connecting user, derive revenue from advertisers via banner displays, popups, and screen icons.

In this manner, the central appliance and coupled universal database, which may be, for example, a switching device as disclosed in copending U.S. patent application Ser. No. 12/240,278, filed Sep. 29, 2008, entitled "SYSTEM AND METHOD FOR ALTERNATE PATH ROUTING AND REDUNDANCY BASED ON COST SENSITIVE NETWORK SELECTION," incorporated herein by reference, receives an outgoing communication from a user via a default, installed transport medium (PSTN, for example), and identifies alternate transport mediums based on a universal identifier of the user. The universal identifier indexes alternate transport mediums available to the user based on entries in the universal database, and determines a lower cost (or no cost) transport medium based on transport mediums available to the recipient and the user attributes of the initiating user. While conventional systems provide a familiar "ringing" sound to the invoking users, in lieu of the conventional ringback, the initiating user receives targeted media referenced from the media database while the communication is completed. The targeted media is provided as a fee based service to media provides (advertisers), therefore injecting revenue for supporting the service without requiring a fee from the invoking users.

Depending on the nature and scope of an installed target network infrastructure, such features may be deployed or phased in piecemeal or over time based on feasibility. Thus, service providers may choose to selectively deploy various features of the disclosed system, such as, the alternative path routing aspect of the invention which uses a lower or no cost transport medium, and the user registration database which contains the universal identifier and demographic info about the user, may be implemented at different times. In a minimalist arrangement, the switching device may implement a targeted media advertising insertion platform (i.e. "Ad Splicer") into telephone audio, in which the determination about the targeted media to insert would be primarily based on location.

The example configuration shown depicts a computing device disposed in communication with a public access network. Various physical deployments will be apparent to those of skill in the art without departing from the scope of the claimed invention. The example computing device includes a highly embedded processor driven appliance having memory and interfaces for performing the steps and actions disclosed herein via instructions encoded in the appliance.

One such alternate deployment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

DETAILED DESCRIPTION

Figure 1:
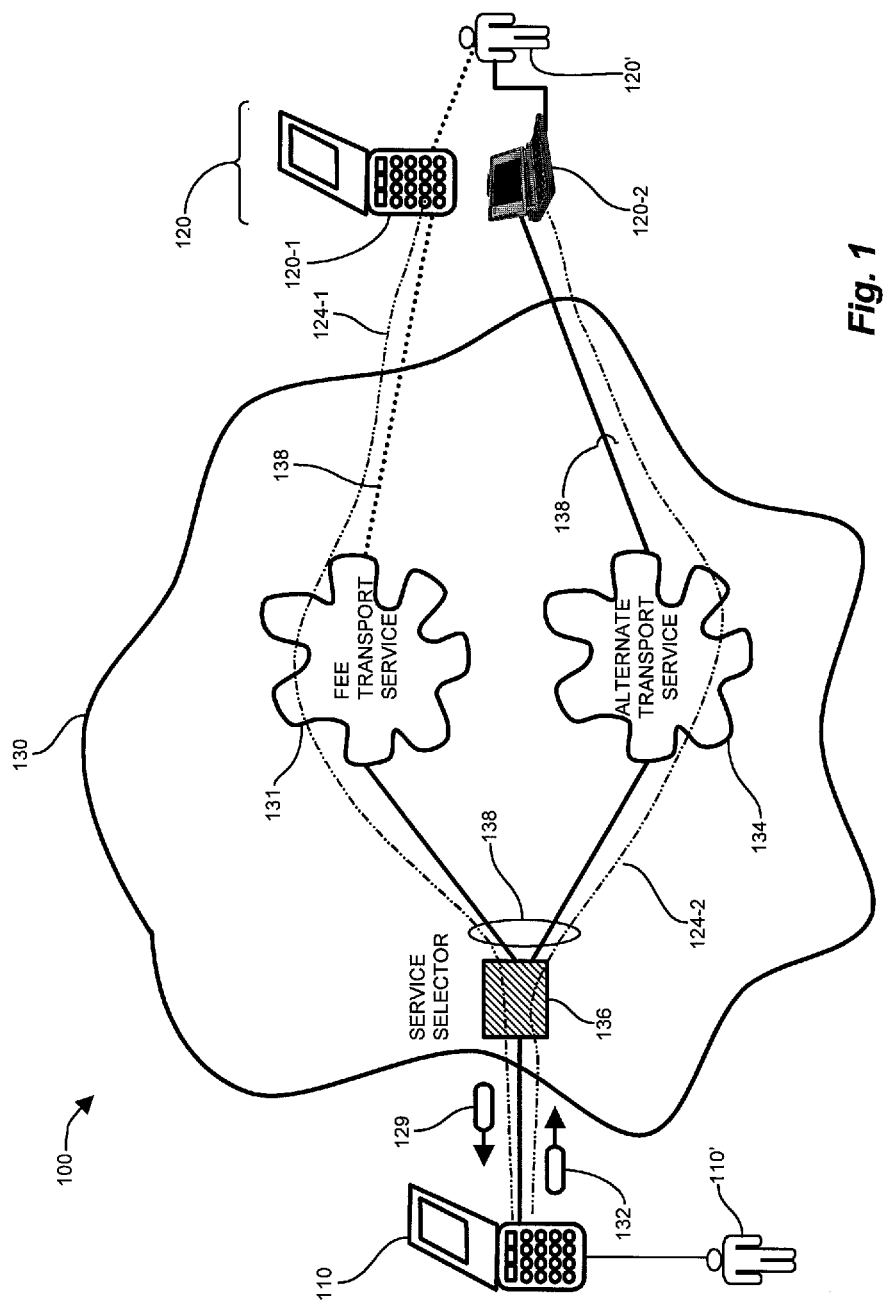
FIG. 1 is a context diagram of a public access network suitable for use with the present invention.

The disclosed approach depicts an example arrangement of identifying and intercepting a call and identifying a preferable communication medium from an intermediate point in the communication path. The intermediate point may be, for example, a point prior to invoking any fees from the local carrier (service provider). A transport network denotes a path between an initiator and recipient of a communication. The service provided by the disclosed system identifies, intercepts the communication and redirects the communication from a default route in favor of a more desirable path. The disclosed system presents an example implementation depicting several communication mediums and destination devices by way of example only. Alternate configurations employing the disclosed method may be apparent.

Certain approaches to PSTN alternatives have been presented. For example, U.S. Pat. No. 7,412,486, to Petrack, et al., discloses a method for processing message data employing a hypertext transport protocol session between the messaging server and the messaging client. The Petrack approach, however, does not disclose installing a voice proxy and a switching device at an intermediate point such as a telecom switching office (i.e. a CO). '486 requires a "user agent" to be run on a PC or a Smartphone or Chat client and the clients connect to the PSTN using the "telephone hosting server" instead of using existing infrastructure—PSTN phones, cellphones & VOIP phones and clients. Further, '486 does not teach Instant Messaging over PSTN, and does not mention funding a telecommunication service through targeted advertising.

In another example, Ribbit Corporation, based in Mountain View, Calif., has a so-called "SmartSwitch" that takes care of multiple networks, protocols and devices to allow the web to be connected to any device in any manner. The Ribbit disclosure suggests that a web page can call a landline phone, and thus a web application can be transformed into a virtual mobile phone. However, the Ribbit approach employs a service model such that the voice object is embedded into websites, chat client, smart phones etc., and does not suggest advertisement for revenue or chat capabilities via a conventional POTS phone. More specifically, U.S. Publication 20080152101 teaches a method and system to establish an Internet telephone call from a terminal device that includes provision and establishment of telephony services over Internet via a web browser. Examples of a terminal device include a web phone embedded in an http server. Such an approach, however, employs some sort of user client and does not suggest ringback usage for media promotion or revenue from advertisements.

Similarly, U.S. Publication No. 20020122429 suggests a method and apparatus to dynamically change the quality of service (QoS) level of a transmission over a network. This approach receives quality of service requests from user input devices coupled to network gateways, and issues commands for a changed quality of service level for a call according to each request. The '429 approach suggests packet based networks, thus implying Internet usage without crossover into twisted pair (i.e. PSTN) accommodation.

Referring now to the system, method and apparatus presented herein, FIG. 1 is a context diagram of a public access network suitable for use with the present invention. Referring to FIG. 1, a communications environment 100 allows an initiator device 110 to establish communication to a recipient device 120 via a transport network 130. The initiator device 110 is operable by a user or operator 110' for performing communication with the recipient device 120, which may for example be a mobile phone (cellphone) as in the example shown, or by another communication device such as a smart handset, Internet enabled laptop or desktop computer, conventional wired (e.g. twisted pair) phone or VOIP phone. Such a communication 132 may take the form of a voice call, text message, or other suitable communication to any of the various recipient devices 120. Other configurations incorporate video via the use of smart 3G handsets with mobile video, or to VOIP Video Phones.

Such a communication 132 follows a transport path 124-1 or 124-2 through the transport network 130 from the initiator device 110 to the recipient device 120 using a series of network links 138 provided by a service provider. The recipient devices 120-1 . . . 120-2 (120, generally) include any suitable voice or chat based communication device, such as cellphones or smart phones, laptops or desktops, conventional wired phone or VOIP phone, etc. The initiator (i.e. user 110') of the communication 132 is a subscriber of the service provider, typically a telephone company or cellular carrier, which provides usage of the network 131 to effect a fee transport service. The service provider provides a default transport medium, defined by path 124-1, over which the communication 132 will occur absent intervening switching as defined herein. In a typical communication, the service provider identifies a series of the network links 138 to connect the initiator device 110 to the recipient device 120, over which the communication travels as a series of so-called "hops" from link 138 to link 138. Each such link 138 is defined by a switching point, at which switching and/or routing decisions are made about the next link 138 to be traversed to reach the recipient device 120. In configurations discussed below, an alternate transport service 134 provides an alternate transport medium allowing the communication to follow the alternate path 124-2 to the recipient device 120-2, in lieu of the fee based path 124-1 to recipient device 120-1.

In a conventional Public Switched Telephone Network (PSTN) or Mobility Network such as a fee based network 131, the switching points include so-called Central Offices (CO), which contain the switching equipment for implementing the routing decisions, usually according to a so called "SS7" protocol, as is known in the art. The service provider meters usage of the communications invoked by a user device 110, and charges a fee based on such usage. Typically this usage is tracked at particular COs along the path 124-1 to the recipient device 120. Conventional telephone communications relied almost exclusively on fee-based PSTN or Mobility networks 131, however Internet infiltration and expansion has marked an introduction of an alternate network 134 of communication carriers and/or protocols, such as Voice Over IP (VOIP) and Upstream Voice/Chat networks such as Skype®, AIM®, Yahoo Messenger Voice®, Google Talk®, as is known in the art.

Configurations herein identify a transfer point 136 defined by the last switching point in the default path 124-1 before a conventional CO imposes a usage charge. A communication 132 from a user device 110 is identified at the transfer point 136, and an alternate transport service, such as an alternate network 134, providing an alternate transport service, is selected for transporting the communication 132 to the intended recipient device 120. An incoming network 144-1 . . . 144-3 (144 generally) depends on the default network invoked by the user, which is typically expected to be a fee-for-services implementation that the disclosed configurations seeks to avoid. The handoff point 136, discussed further below, identifies a no-cost or lowest cost alternative by examining communication mediums invokable by both the initiator device 110 and the recipient device 120, and selectively switches the communication 132 to the selected alternate network 134 via the alternate path 124-2. The alternate network 134 maintains several subnetworks, including Voice over IP (VOIP) 134-1, Upstream Voice/Chat network 134-2, mobility/cellular 134-3, and twisted pair PSTN interconnections 134-4 of a null or lesser cost than the conventional network 131.

During the brief interval while the call or communication 132 is switched to the recipient device 120, user specific feedback 129 may be provided to the user device 110 for the period commonly referred to as the "ringback," or "ringing" sound heard by the incoming caller in conventional systems. In configurations disclosed herein, this feedback period of approximately 10-15 seconds may be employed for various purposes, such as user selected tones, predetermined information streams or messages, or targeted media and advertising provided by the service provides, as disclosed in the copending U.S. Patent Application cited above. Targeted media 129 directed to the user 110' is based on stored demographic information, discussed further below, or based on geographical location of the user using methods also discussed further below. Fees for generating and displaying (sending) the targeted media supports the cost of maintaining the service and switching equipment for intercepting the communication 132 and routing on the alternate network 134. The targeted media 129 directed to the user 110' can be uni-directional (i.e. downstream only) or interactive. Mechanisms exist and will be explained further below to create an interactive shopping session with the user 110' based on the type of targeted media advertising. Furthermore, since the user 110' is identified via the User Registration Database, authenticated and secure payment facilitation can be also performed by the device disclosed herein.

Figure 2:
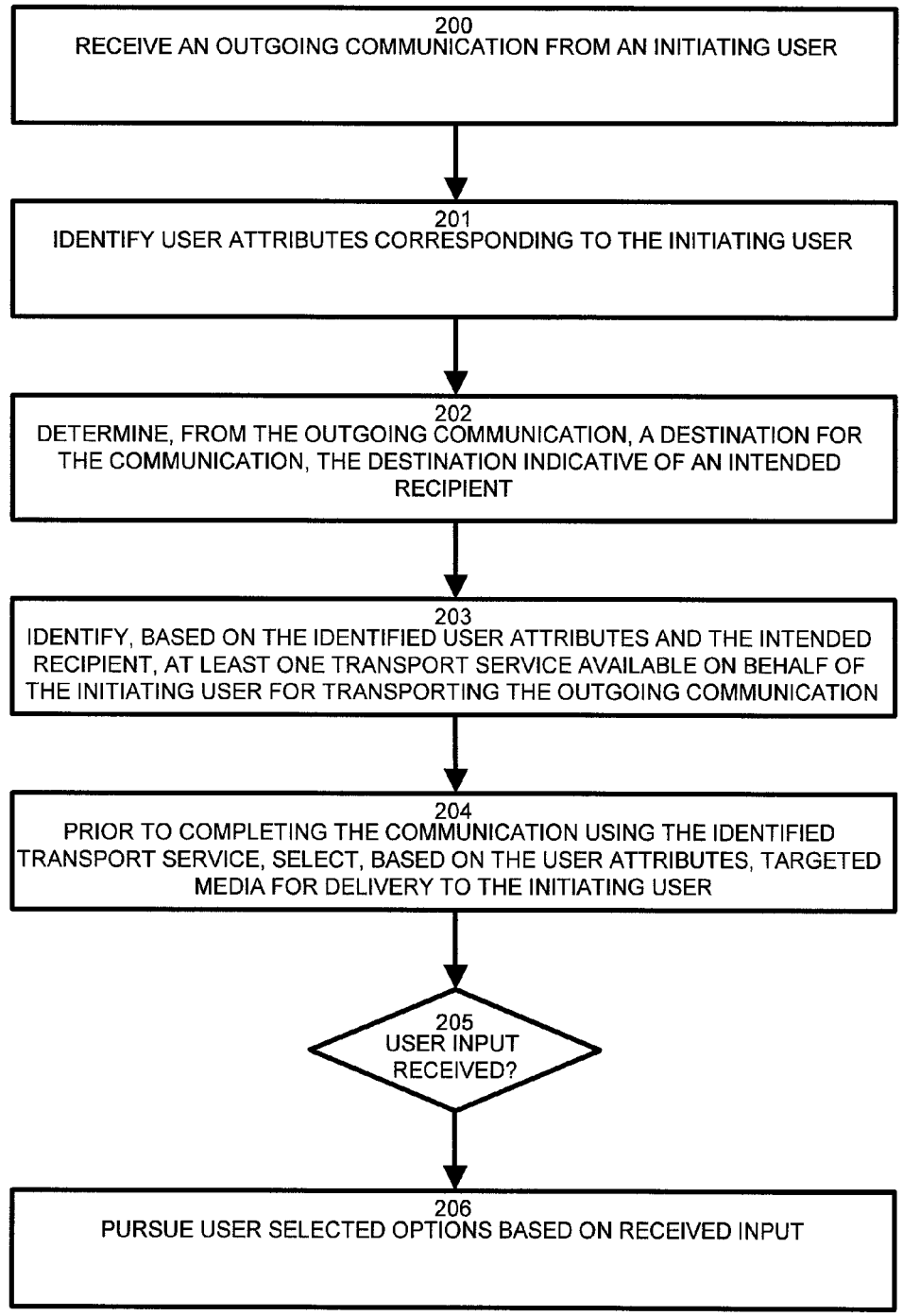
FIG. 2 is a flowchart of call message completion in the network of FIG. 1.

FIG. 2 is a flowchart of call message completion in the network of FIG. 1. Referring to FIGS. 1 and 2, the method of providing a communication service for message completion as disclosed herein includes, at step 200, receiving an outgoing communication 132 from an initiating user 110', and identifying user attributes corresponding to the initiating user 110', as depicted at step 201. A user registration database 154, discussed further below, stores the user attributes for identifying demographics and device information pertaining to individual users (initiating users 110' and recipients 120'). The method determines, from the outgoing communication 132, a destination for the communication, the destination indicative of an intended recipient 120', as disclosed at step 202. A switching selector at the switching point 136 identifies, based on the identified user attributes and the intended recipient device 122, at least one alternate transport service 134 available on behalf of the initiating user 110' for transporting the outgoing communication 132, as shown at step 203. Prior to completing the communication 132 using the identified transport service, the service selector 136 selects, based on the user attributes, targeted media 129 for delivery to the initiating user 110', as shown at step 204. The targeted media 129 is delivered to the user based on user attributes applied to media selections to which the user 110' is deemed responsive, discussed further below. The user attributes may include, for example, location, demographics, buying habits, or other factors indicative of effective advertising. One particular alternative is to select the media based on geographical location of the user, thus minimizing demographic and marketing computations, also discussed further below. The targeted media 129 occupies a connection interval during which a ringback signal is commonly heard/displayed while an outgoing communication 132 is being initiated. The outgoing communication 132 may be either a single packet or message, as in the case of a text, email or voice mail, or may initiate a series of subsequent messages defining the communication 132, such as a voice phone call or streaming media.

Depending on the nature of the targeted media, such media may present opportunities for user input requesting specific options, such as via a voice prompt menu. Accordingly, at step 205, a check is performed for receipt of user input, and additional actions pursued responsive to the input, as depicted at step 206. For example, when a user listens to an advertisement and likes it during the ringback period, the service selector 136 presents voice prompts to press #1 or #2, thus providing an element of interactivity:

1 requests the service selector 136 to email same advertisement in HTML format to my registered email address. For this option advertiser can email E-coupons to the user along with the advertisement.

2 means—please connect me to a call center that sells this product after I complete my call. For this option—the user is already logged in and authenticated. So the Telco (telephone company, or dialtone service provider) can act similar to online payment providers such as PayPal®—be a clearing house for secure and confirmed payments for transactions. The Telco can also track user purchasing patterns and notify upstream merchants about buying patterns, and effect corresponding changes to the user registration database 154 profile. Such profiling is akin to tracking user surfing and buying habits online using cookies in HTML, as is commonly practiced by online marketing strategies.

Figure 3:
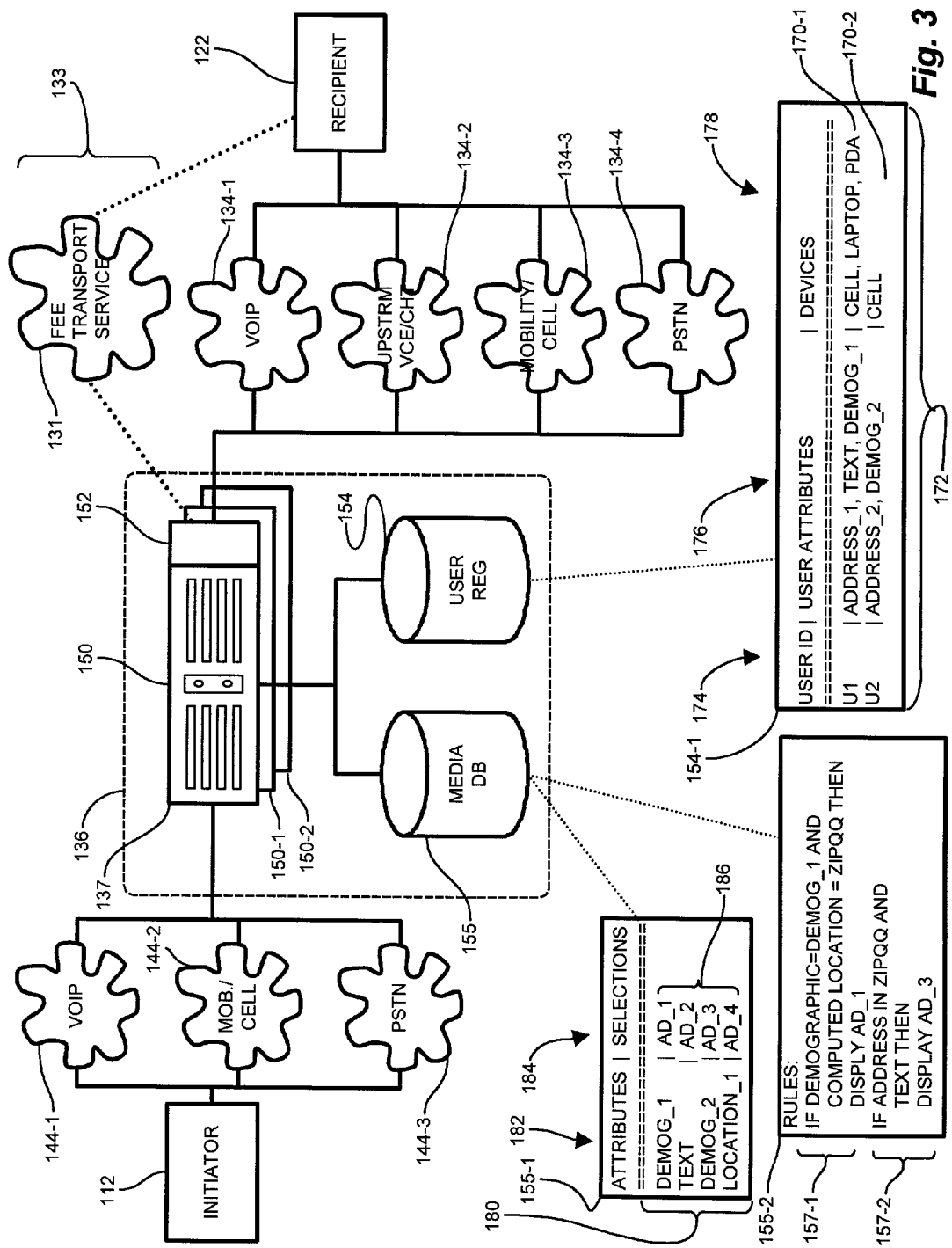
FIG. 3 is a block diagram of call responsive media feedback as defined in FIG. 2.
Figure 4:
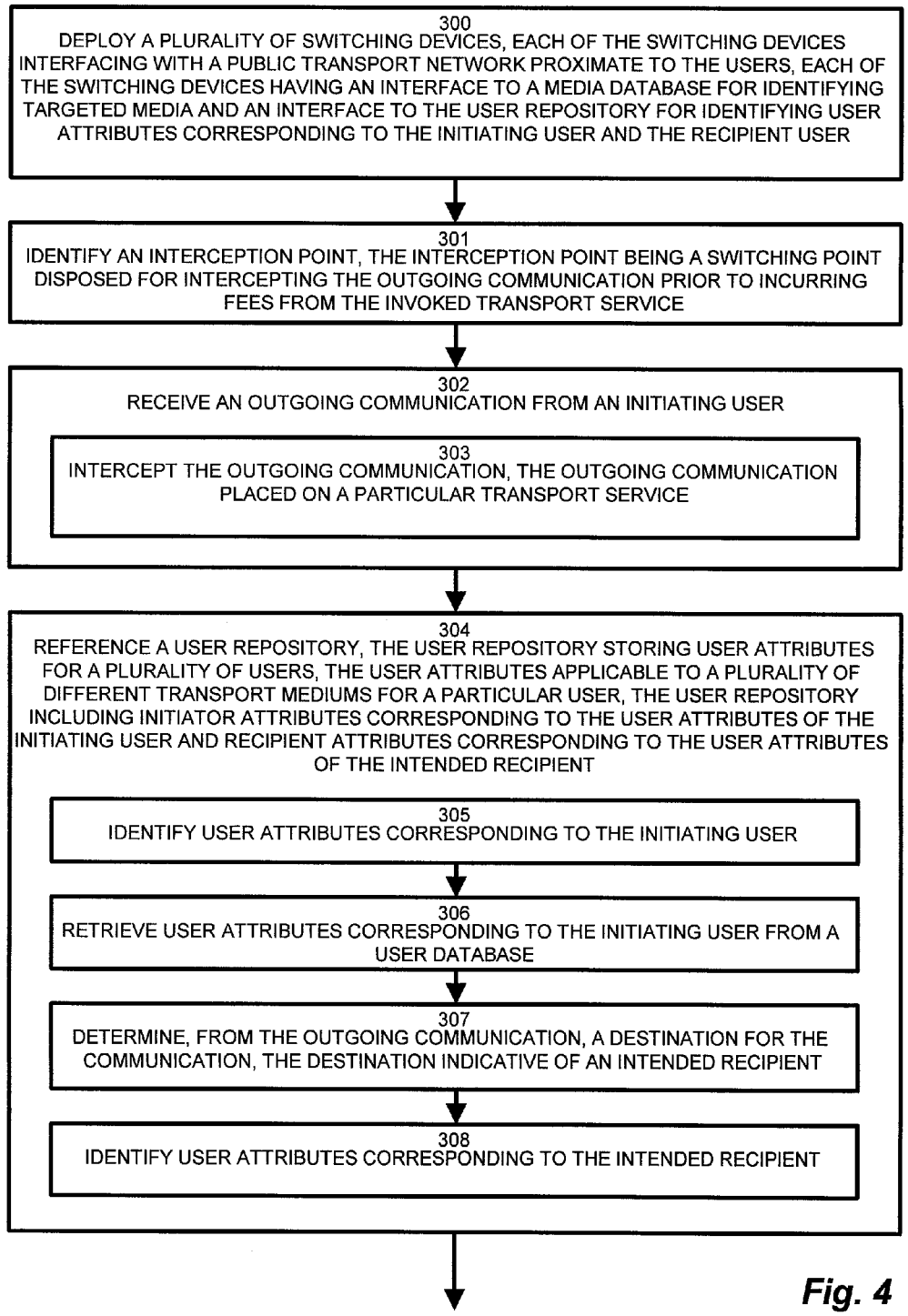
FIGS. 4-7 are a flowchart of user specific media selection employed in FIG. 3.
Figure 5:
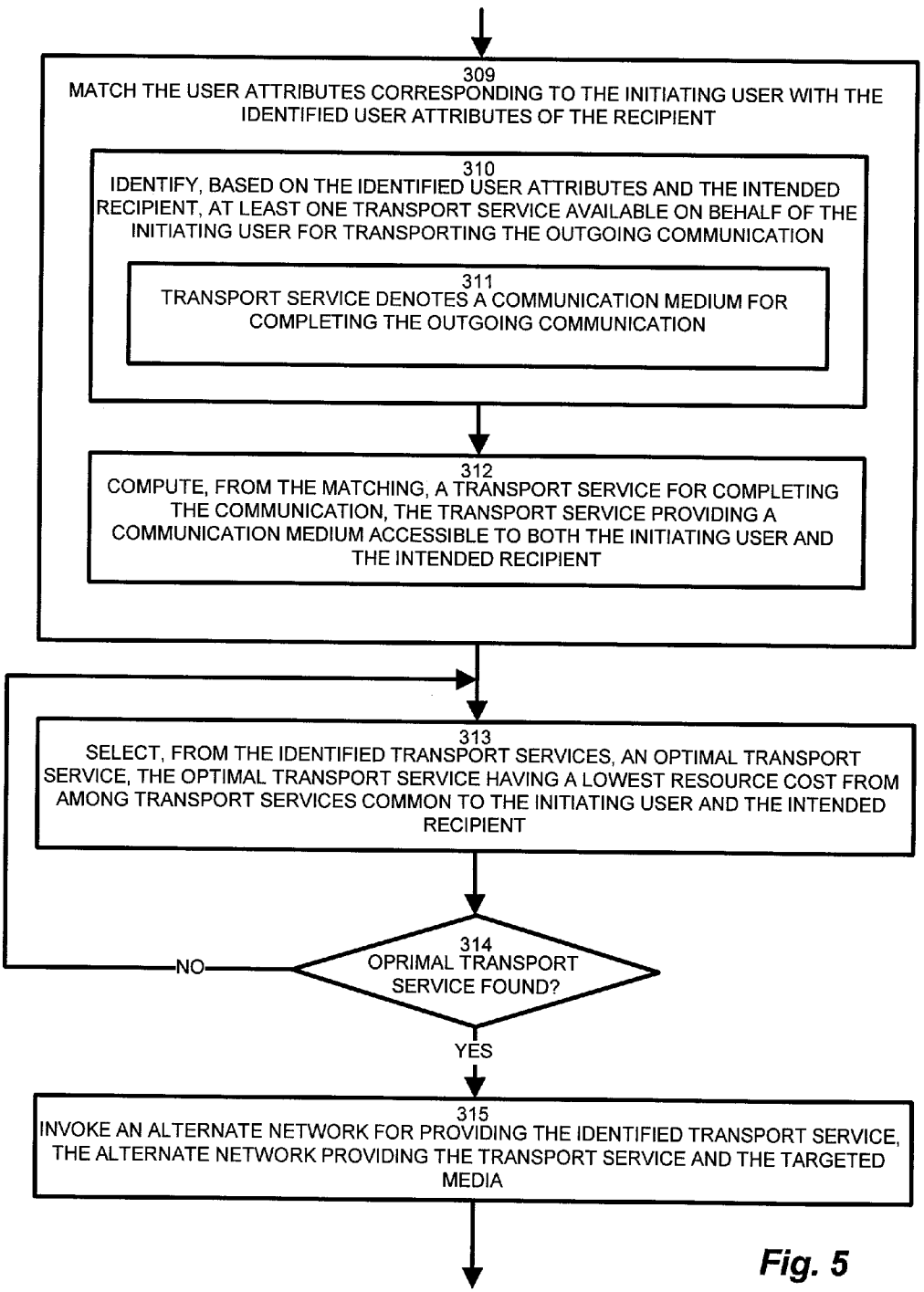
Figure 6:
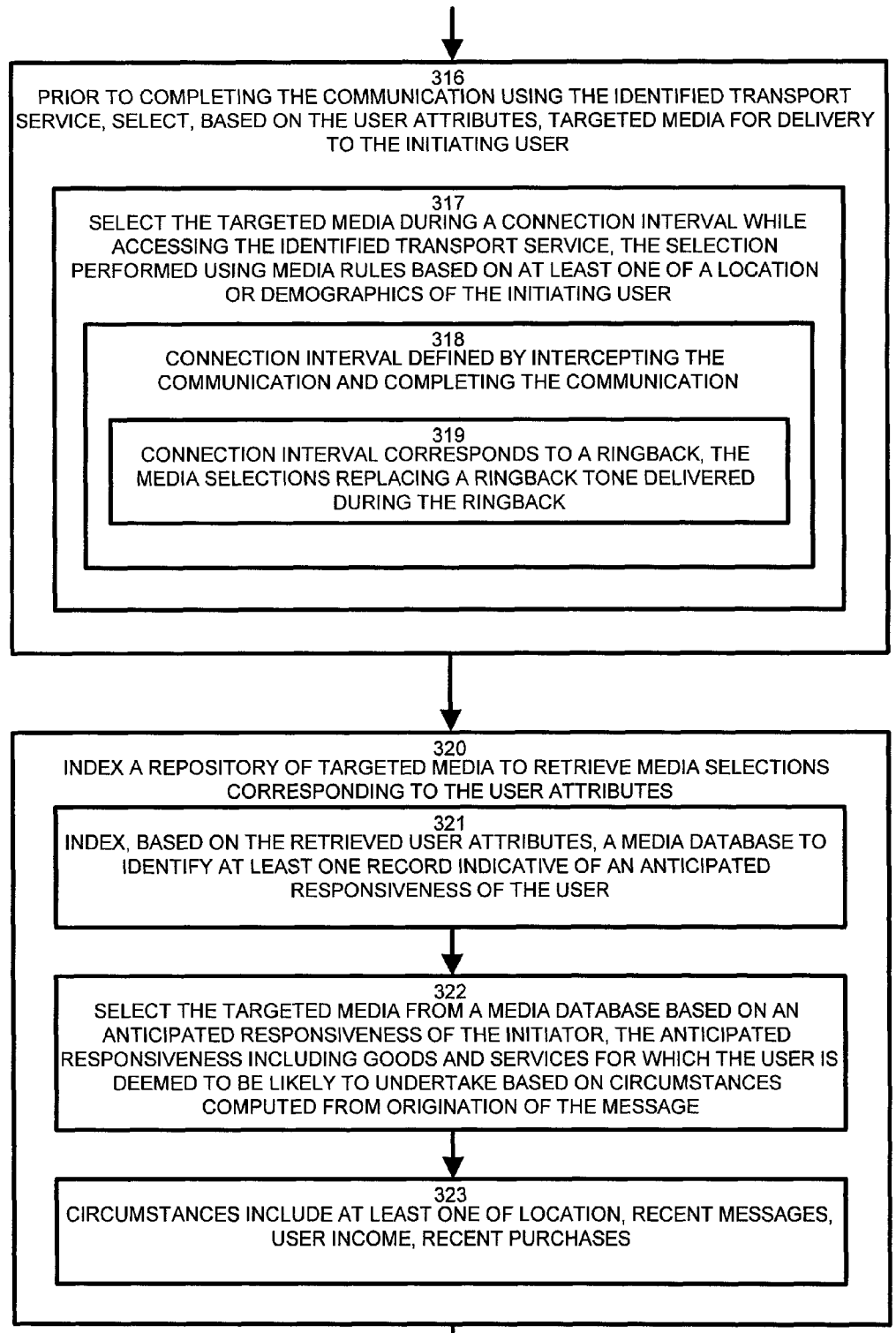
Figure 7:
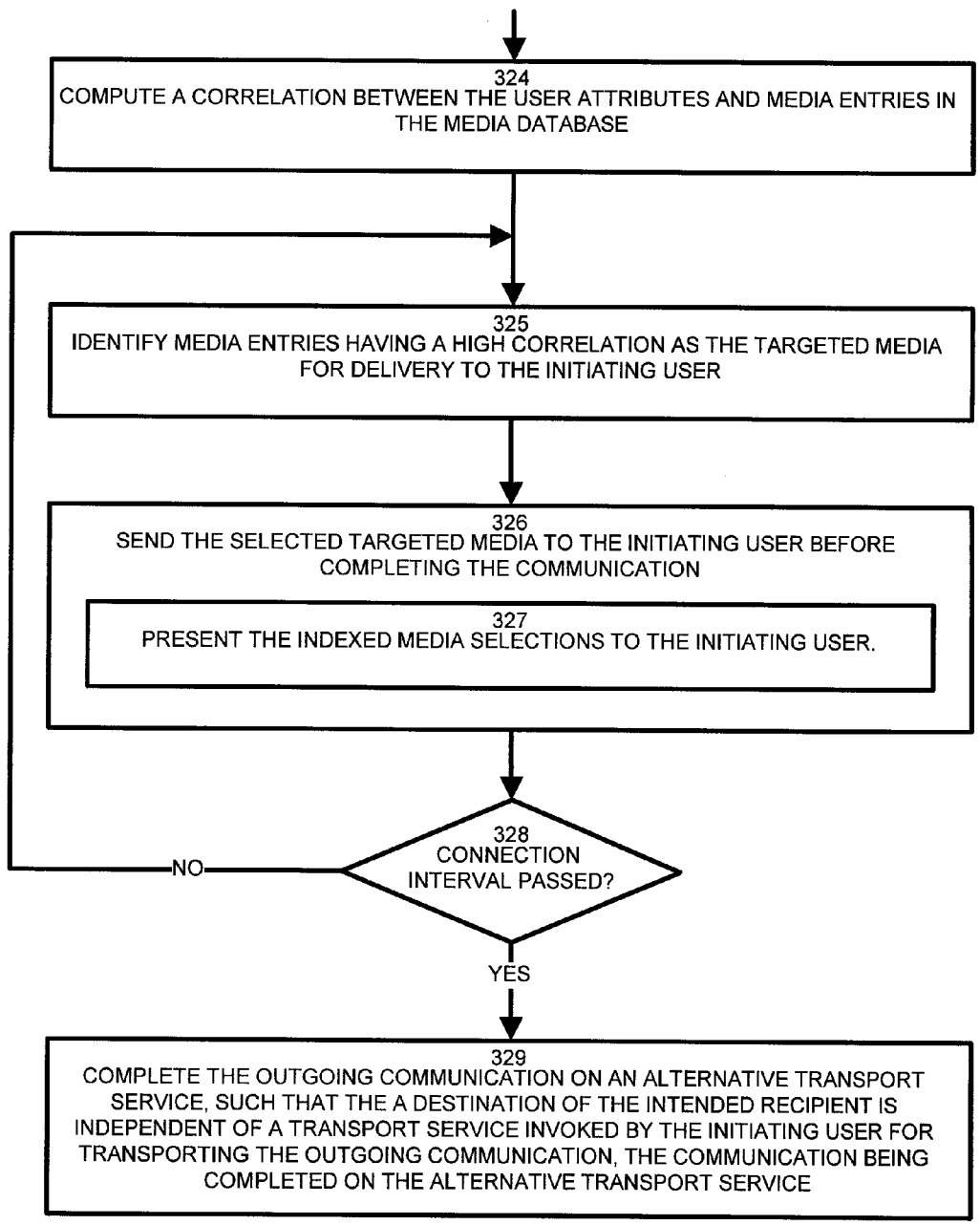

FIG. 3 is a block diagram of call responsive media feedback as defined in FIG. 2. Referring to FIGS. 1 and 3, the handoff point 136 denotes an interception device 137 including a switching selector 150 and a switching interface 152, collectively defining the interception device 137. The switching selector 150 identifies a call or communication 132 from a user device 110 on behalf of a user 110', collectively defining an initiator 112, to a recipient 122 defined by a recipient device 120 and receiving user 120'. The switching selector 150 identifies at least one of several alternate transport paths 124-2 for the communication 132, and the switching interface 152 routes the communication 132 from the default network 132 to the alternate network 134 providing the alternate paths 124-2 to avoid the fee metered section 133 of the network 130. The alternate network 134 maintains several subnetworks, including Voice over IP (VOIP) 134-1, Upstream Voice/Chat network 134-2, mobility/cellular 134-3, and twisted pair PSTN interconnections 134-4 of a null or lesser cost than the conventional network 131. Depending on the services subscribed to and/or available to both the initiator 112 and the recipient 122, the switching selector 150 identifies one or more of the alternate networks 134-1 . . . 134-4, each providing an alternate transport medium to define the alternate transport paths 124-2. Additional alternate networks 134-N may be identified.

The transfer point 136 includes a cached subset copy of the global user registration database 154 coupled to the switching selector 150 for storing information pertaining to users including both the initiator 112 and the recipient 122, including the alternate networks 134 and related access information available to the initiator 112 and recipient 122. The switching selector 150 also interfaces with a media database 155 for identifying media entries AD_1 . . . AD_4 for delivery to the initiator 112. A registration table 154-1 includes entries 170-1 . . . 170-2 (170 generally) for each user (initiator and recipient 112, 122) and includes, for each user, fields 172 including user ID 174, user attributes 176 and available devices 178. An attributes table 155-1 stores entries 180 of attributes 182 and selections 184, such that the attributes 182 correspond to the user attributes 176 and the selections 184 denote media entries AD_1 . . . AD_4 (186, collectively) that may be of interest to a user with the respective attribute 180. For example, a user with a TEXT attribute 176 indicative of an ability to send and receive text messages might receive media entry AD_2, which pertains to a text messaging service promotion. A set of rules 155-2 further denotes, for combinations of user attributes 176, media entries AD_n to display. The rules 155-2 may be applied in a prioritized manner to first identify media entries 186 more likely to appeal to or catch the attention of the receiving user (initiator 112).

The rules 155-2 may invoke additional computations and evaluations, including computed and static attributes. A static attribute is stored in the user attribute field 176, such as the user's address or demographic information about age, interests, income, etc, while a computed attribute might include dynamic information such as a current location derived from Telco 911 database or Assisted GPS positioning or Triangulation or a recent purchase, for example. The rules may therefore be invoked to express, for example, an action resulting from a user with a certain interest (demographic) having a current location in a particular zip code, such as a user with an interest in reading, computed from recent credit card purchases, receiving an advertisement about a retail bookstore nearby in zip code ZIPQQ (rule 157-1). Similarly, combining the above example, a user 110' with a known text ability and having a home address in a particular zip code may be delivered an ad pertaining to a local retailer with a newly released texting/mobility device (rule 157-2). Other more complex media selection 186 and rule combinations 155-2 may be envisioned.

For example, as suggested above, more complex media selections may include interactive approaches integrated within the rules, such as: When user listens to an advertisement and likes it during the ringback period, they should be able to press #1 or #2. That provides an element of interactivity:

1 means—please email same advertisement in HTML format to my registered email address. For this option advertiser can email E-coupons to the user along with the advertisement.

2 means—please connect me to a call center that sells this product after I complete my call. For this option—we are already logged in and authenticated. So the Telco can be a clearing house for secure and confirmed payments for transactions.

FIGS. 4-7 are a flowchart of user specific media selection as employed in FIG. 3. Referring to FIGS. 1 and 3-7, an example deployment of the disclosed approach includes deploying a plurality 150-1 . . . 150-2 (150-N generally) of switching devices, such as the switching selector 150, in which each of the switching devices interfaces with a public transport network proximate to the users 110', 120', as depicted at step 300. Each of the switching devices 150-N has an interface to a media database 155 for identifying targeted media 186 and an interface to the user repository (registration database) 154 for identifying user attributes 176 corresponding to the initiating user 110' and the recipient user 120'. A plurality of the service selectors 150 deployed proximate to public access networks 130 such as the Internet and conventional PSTN and Mobility networks allows each respective service selector 150 to perform optimal selection of the alternate transport services 134, which may include invoking a path 124-2 to a remote service selector 150 proximate to the recipient 122.

Deployment of each service selector 150 involves identifying an interception point 136, such that the interception point 136 is a switching point disposed for intercepting the outgoing communication 132 prior to incurring fees from the invoked network 131 (transport service), as disclosed at step 301. Therefore, the service selector 150 watches or polls a default transport service 131 on which the communication 132 would travel absent intervention from the service selector 150. The service selector 150 receives an outgoing communication 132 from an initiating user 110', as shown at step 302. The intercepted outgoing communication 132 is placed on a particular transport network 131 defining the default transport path 124-1, as clarified at step 303. The default transport path 124-1 may be, for example, a wired phone call placed for the PSTN network, or a mobile (cellphone) call directed to the user's primary mobility carrier, for example.

Using the intercepted communication 132, the service selector 150 references the user repository defined by the user registration database 154, such that the user repository 154 stores user attributes 176 for a plurality of users 110', 120', as depicted at step 304. The user attributes 176 are applicable to a plurality of different transport mediums and/or devices 178 for a particular user 154, defined by a user ID 174. The user repository 154 includes both initiator 110 attributes corresponding to the user attributes 176 of the initiating user and recipient 122 attributes corresponding to the user attributes 176 of the intended recipient 122.

The user registration database 154 therefore serves as a universal registration for users 110', 120' regardless of transport services the user subscribes to, in contrast to conventional user repositories which are generally specific only to a particular carrier, service or medium. In the example communication scenario, the database 154 is invoked for identifying user attributes 176 corresponding to the initiating user 110', as depicted at step 305, and for retrieving the user attributes 176 corresponding to the initiating user 110' from the user registration database, as shown at step 306. The service selector 150 determines, from the outgoing communication 132, a destination for the communication, in which the destination is indicative of the intended recipient 122, as disclosed at step 307. The service selector identifies user attributes corresponding to the intended recipient 122, also from the user registration database 154, as depicted at step 308, so that the user attributes of both the initiator 112 and recipient 122 may be matched to determine the alternate transport service 134.

After retrieving the user attributes 176 of both the initiator 112 and the recipient 122, the service selector 150 matches the user attributes 176 corresponding to the initiating user with the identified user attributes of the recipient, as depicted at step 309, to identify, based on the identified user attributes 172 and the intended recipient 122, at least one transport service 134-N available on behalf of the initiating user 110' for transporting the outgoing communication 132, as shown at step 310. The transport service 134 typically denotes a communication medium for completing the outgoing communication 132, as disclosed at step 311, such as VOIP or Upstream Voice/Chat network such as Skype®, AIM®, Yahoo Messenger Voice®, Google Talk® and others, although a particular communication (transport) medium may be provided by multiple service providers. The service selector 150 computes, from the matching, a transport service 134 for completing the communication 132, in which the transport service provides a communication medium accessible to both the initiating user (initiator) 112 and the intended recipient 122, as depicted at step 313, typically selecting a lowest cost or "free" medium accessible to both.

The service selector 150 attempts to select, from the identified transport services 134-N, at least one of several optimal transport services 134 providing the transport paths 124-2, such that the optimal transport service 134 has a lowest resource cost from among transport services common to the initiating user 112 and the intended recipient 122, as disclosed at step 313. Selection of the transport service to invoke may define an iterative process considering transport mediums available to both the initiator 112 and recipient 122. Accordingly, a check is performed, at step 314, to determine if one or more optimal transport service has been found, and control conditionally reverts to step 313.

Based on the determined transport service 134, the switching interface 152, responsive to the service selector 150, invokes the best alternate network 134 for providing the identified transport service, such that the alternate network (transport service) 134 provides the transport service and sends the targeted media 129, as depicted at step 315. Prior to completing the communication 132 using the identified transport service 134, the service selector 150 selects, based on the user attributes 176, targeted media 186 from the media DB 155 for delivery to the initiating user device 110, as shown at step 316. As indicated above, the selected media 129 is intended to be responsively received by the user 110' based on a correlation of the user attributes 176. The service selector 150 therefore selects the targeted media 129 during the connection interval while accessing the identified transport service 134, as shown at step 317. The selection is performed using media rules 155-2 based on at least one of a location or demographics of the initiating user 120', determined from the user attributes 176. Targeted media 129 selection occurs during a connection interval defined by intercepting the communication 132 and completing the communication 132, shown at step 318. In the example arrangement, the connection interval corresponds to a ringback (the brief "ringing" sound heard in conventional systems while the call is connected), such that the media selections replace the ringback tone delivered during the ringback interval, as depicted at step 319. The targeted media directed to the user can be uni-directional (i.e. downstream only) or interactive. Mechanisms to create an interactive shopping session with the user based on the type of targeted media advertising have been explained. Further more, since the user is identified via the User Registration Database, authenticated and secure payment facilitation can be also performed by the Telco using the service selector.

While the interface 152 establishes the connection, the service selector 150 indexes the media repository 155 of targeted media to retrieve media selections 186 corresponding to the user attributes 176, as depicted at step 320. Indexing the repository of targeted media 155 based on the user attributes 176 may include identifying computed attributes and stored attributes, in which the computed attributes are generated upon evaluation and the stored user attributes 176 are retrieved from the user registration database 154. In the example shown, this includes indexing, based on the retrieved user attributes 176, the media database 155 to identify at least one record 180 indicative of an anticipated responsiveness of the user 110', as disclosed at step 321. The anticipated responsiveness includes goods and services for which the user is deemed to be likely to undertake based on circumstances computed from origination of the message, as clarified at step 322. In the example configuration, such circumstances may include at least one of location, recent messages, user income, recent purchases, and other attributes, characteristics, or patterns attributed to the user 110' via demographics, location, and history, depicted at step 323.

The service selector 150 computes a correlation between the user attributes and media entries in the media database 155, as shown at step 324. Selecting the targeted media 129 may also involve retrieving user attributes 176 indicative of demographics of the user 110', and invoking media rules 155-2 correlating the retrieved user attributes 176 to media selections of interest based on the demographics of the user. Therefore, the media selections 184, in the example shown, are correlated to users 110' in at least two ways. The media selection table 155-1 maps media selections 186 to user attributes 176 for determining, for a user having a given attribute 182, such as, for example, "has text capability" or "has school age children" to a media selection 186 targeted to text message users or adolescent clothing, respectively. A more refined approach may be invoked using the rules 155-2, which denote multiple attribute 176 conditions in a conjunctive or disjunctive manner. Further, such attributes may be static, as stored in the registration table 154, or may be dynamic, and computed in realtime, such as a Telco 911 database or Assisted GPS positioning or Triangulation based location indicative, or proximity to a retail center.

Based on the correlation at step 324, the service selector 150 identifies the media entries 186 having a high correlation as the targeted media 129 for delivery to the initiating user 110', as depicted at step 325. The service selector 150 sends the selected targeted media to the initiating user before completing the communication 132, i.e. during the ringback interval, as disclosed at step 326. The user device 110 presents the indexed media selections 186 to the initiating user 110', as shown at step 327. Depending on the duration for establishing a connection via the alternate transport service 134, additional media selections 186 may be required to occupy the connection interval. Accordingly, a check is performed, at step 328, to determine if the connection interval has passed and the communication has been established or completed. If the connection is still in progress, control reverts to step 325 to select additional media entries 186. As indicated above, media entries are selectable by a variety of mechanisms—a simple location based determination, selections 184 keyed to user attributes 176, or more complex rules 157, also including interactive feedback from users 120'. Otherwise, the service selector 150 completes the outgoing communication on the selected alternative transport service 134, such that the a destination of the intended recipient is independent of a transport service invoked by the initiating user 112 for transporting the outgoing communication 132, such that the communication is completed on the alternative transport service 134, as depicted at step 329. In other words, the initiator 112 identifies the recipient 122 in the user registration database 154, and the service selector 150 identifies the transport medium 134, rather than the user's choice of device 110 (cell phone, wired phone, Skype equipped PC) determining the transport medium. In a similar matter, service providers may choose to deploy only particular media targeting features of the disclosed system. Specifically, the alternative path routing aspect of the invention which uses a lower or no cost transport medium could be optional. Likewise, the user registration database which contains the demographic info about the user need not be implemented for the claimed targeted media. In this, simplest of implementations, the disclosed device would be a simple targeted media advertizing insertion platform (i.e. "Ad Splicer") into telephone audio. The determination about the targeted media to insert would be purely based on location in this embodiment.

The user registration database 154, therefore, provides a universal identifier, or user ID 174, for communication between an initiator 112 and recipient 122. Referring now in detail to the user registration database 154, creation of the user registration database 154 provides an underlying infrastructure for matching initiators 112 to recipients 122. This database 154 is to be used by the service provider of the interception device 137 for user identification, authentication and security, connectivity establishment, selection of targeted user advertising and billing. Thus, it is most useful for secure payments using a PayPal® model for example, also can be used for automatic authentication when calling banks, government institutions, etc. . . . This turns the Telco into a broker player in the authentication and security services industry. Initial creation and population, in particular configurations, may be as follows:

a. User 110' logs in into a web site, and registers. User provides an ID and a password, or some other unique identifier.

a.1 In the case the user is a PSTN network subscriber, the identifier could be the home phone number and a predetermined pin.

a.2 If the user is a Mobility network subscriber, the unique identifier could be the Mobile number. This input could be authorized by sending a random authentication code to that mobile number and asking the user to enter the authentication code to continue with the registration. This is similar to the "Login To Mobile" feature that many service providers like Yahoo® Messenger utilize today.

a.3 If an interface device 111 as described in the co-pending patent cited above (such as via a UPMS key chain or similar personal device) is distributed by the service provider, the unique identifier could be stored in a small non volatile memory in the key chain.

b. If service providers are not utilizing a registration web site for signing up users, the same information can be collected and registered by the service provider using a toll free number. In this case, to make the process of registering simple and straight forward, the user can authorize the PSTN, or Mobility or VOIP service provider to use existing stored records for that user-subscriber in their database—such as date of birth, billing address etc.

c. In the process of registration the user provides all their contact information. specifically, for example:

Home, Mobile or Work phone numbers;

Phone numbers associated with VOIP service providers that use MTAs or IP Phones with TR-69 based or proprietary authentication and provisioning;

Email addresses with talk/chat capabilities such as Google®, Hotmail®, Yahoo®, etc. . . . along with passwords;

Talk/chat program handles such as AIM, Skype®, etc. along with passwords;

Web2.0 ID's of services with talk/chat capabilities invoking public domain websites such as Facebook®, MySpace™, etc. along with passwords;

d. User can provide a "dial plan"—for incoming calls in different times of the day/week, the service should try to access him at different numbers and services, with different priority and with different number of retries.

e. User can enter contact information for frequently dialed destinations and assign "aliases" to them—e.g. "111=1-888-5551212", "112=mymail@aim.com", etc.

f. User can provide demographic info such as—education level, ethnic background, income level, hobbies, etc. . . . This is to allow better targeted advertising to the user when they use the service.

g. User can provide a choice how they will be using the service. There are several possible funding models for the service. Targeted advertizing disclosed here in is one of them. However, other models are possible too. For example—users can opt to pay the service provider a small monthly fee, less than current monthly charges, to opt out of the advertizing and not to receive the targeted advertizing. This "buy out" option will work as a financial model for the service providers' since it is envisioned that most of the users will opt for the targeted advertizing, and the advertizing model will subsidize the build out of the service and allow the service providers to offer a reduced fee to the users with the "buy out" option and still realize a hefty return per user—ARPU. Another model could be to provide an aspect of social networking and micro blogging to the service. The period normally allotted to targeted advertizing could be instead used to send info about the destination user—a personal greeting from them, their current status (i.e. "I am listening to wicked music" etc. . . . ). This is similar to the business model of the social networking company Twitter®. Mechanisms can be developed to update that info about the user on a real time basis (i.e. a special number and to call and record, or integrate an application on Facebook® or similar sites to click and record the user's messages).

h. The service providers may choose in their deployment to designate UserIDs as a unique worldwide. Then they could be used for "dial by name" ID service. Also, this would have the added benefit of allowing users to use their registration info worldwide, without having to re-register in different countries. A mechanism needs to exist between service providers to ensure that these IDs are indeed unique and unambiguous. The details of provisioning UserIDs and ensuring their uniqueness and the mechanics of querying uniqueness may be defined in detail via appropriate protocols and published through promulgation mediums such as the IETF "Request For Comments" mechanisms. Together, the mechanism of querying the User Registration Databases and resolving user info, user attributes for value added advertizing and the optimal redundant path selection, constitutes a new functionality that can be termed "Voice-DNS" since it is to a large extent similar in intent and spirit to TCP/IP data DNS (domain name service and domain name resolution).

The user registration database 154 is maintained by the service provider of the service selector 150 via fully redundant, 24/7 availability data centers, accessible through a high speed, secure data network such as 10G Ethernet. Such registration employs sufficient caching and propagation mechanisms to provide timely registration data, as discussed above with respect to distributed database implementations for the interception devices 137. A robust manner to implement such a data center would be to use some optimal DBMS format for storing the information and XML format for querying the records using some protocol similar to TR-69. This would be done using SSL for security and reliability.

Once the user registration database 154 exists, the service provider needs to roll out the service by using service selector 150 boxes installed in selected local exchanges, alongside the PSTN or Mobility or VOIP infrastructure. These boxes 150 have TDM interfaces (such as switching interface 152) to traditional PSTN or Mobility equipment, IP interfaces to Next Generation PSTN equipment and IP interfaces towards the Internet.

Streaming advertising as targeted media 129 therefore allows providing the service to be provided for free to the user 110'. Associated advertising revenue by the service provider should be tracked and accounted for, to provide a share to the Telephony, Mobility, VOIP, Instant Messaging and Web 2.0 network providers, so that they would allow access to their network by the service selector 150 service.

Industry standard advertising provider APIs like Google® could be used, and the user registration database 154 is compatible with them. Alternatively, new advertizing APIs, better geared towards combined Audio+Text advertizing could be developed and standardized. Users are identified, location and/or preferences would be used to match a set of attributes that would be sent to the advertising provider using this API, and the most optimized "sound byte"—"jingle" and text advertising would be selected and streamed through service selector.

In the example configuration shown, the service selector 138 is supported by a revenue model in which advertisers pay a fee for the targeted media provided by the service selector 138. Advertisers specify the rules 155 and selections 184 based on a fee structure. The fee structure supports the service selector 138 operations such that users may be provided the alternate transport 124-2. However, alternative user arrangements, such as an "opt out" fee to allow users to elect NOT to receive targeted media, may be provided in alternate configurations.

In this manner, users can provide a choice how they will be using the service. There are several possible funding models for the service. Targeted advertising disclosed here in is one of them. However, other models are possible too. For example—users can opt to pay the service provider a small monthly fee, less than current monthly charges, to opt out of the advertising and not to receive the targeted advertising. This "buy out" option will work as a financial model for the service providers' since it is envisioned that most of the users will opt for the targeted advertising, and the advertising model will subsidize the build out of the service and allow the service providers to offer a reduced fee to the users with the "buy out" option and still realize a hefty return per user—ARPU. Another model could be to provide an aspect of social networking and micro blogging to the service. The period normally allotted to targeted advertising could be instead used to send info about the destination user—a personal greeting from them, their current status (i.e. "I am listening to wicked music" etc. . . . ). This is similar to the business model of the social networking company Twitter®. Mechanisms can be developed to update that info about the user on a real time basis (i.e. a special number to call and record, or integrate an application on Facebook® or similar sites to click and record the user's messages).

Those skilled in the art should readily appreciate that the programs and methods for providing communications services as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for providing communications services has been particularly shown and described with references to embodiments thereof, it will be understood by those skilled in the art that various changes in form and details may be made therein without departing from the scope of the invention encompassed by the appended claims.

What is claimed is:

1. A method of providing a communication service comprising:
receiving an outgoing communication from an initiating user;
identifying user attributes corresponding to the initiating user;
determining, from the outgoing communication, a destination for the communication, the destination indicative of an intended recipient;
identifying, based on device information in the identified user attributes and the intended recipient, at least one transport service available on behalf of the initiating user for transporting the outgoing communication;
matching the identified device information from the user attributes corresponding to the initiating user with user attributes of the recipient;
computing, from the matching, a transport service for completing the communication, the transport service providing a communication medium accessible to both the initiating user and the intended recipient;

prior to completing the communication using the identified transport service, selecting, based on the user attributes, targeted media for delivery to the initiating user, further including:
selecting the targeted media from a media database based on an anticipated responsiveness of the initiating user, the anticipated responsiveness including goods and services for which the user is deemed to be likely to undertake based on circumstances computed from origination of the message, the circumstances include at least one of location, recent messages, user income and recent purchases;
selecting the targeted media during a connection interval while accessing the identified transport service, the selection performed using media rules based on at least one of a location or demographics of the initiating user; and
transmitting the selected targeted media to the initiating user as a revenue based service provided to advertisers by sending the selected targeted media to the initiating user before completing the communication, further comprising:
retrieving the user attributes corresponding to the initiating user from a user registration database;
indexing, based on the retrieved user attributes, the media database to identify at least one record indicative of the anticipated responsiveness of the user; and
computing a correlation between the user attributes and media entries in the media database;
identifying media entries having a high correlation as the targeted media for delivery to the initiating user;
presenting the identified media entries to the initiating user, the media entries including interactive response prompts; and
receiving, responsive to the media entries, user input indicative of successive media entries.

2. The method of claim 1 wherein the transport service denotes a communication medium for completing the outgoing communication, further comprising
identifying device information in the user attributes corresponding to the intended recipient; and
transmitting, while computing the transport service, the targeted media to the initiating user, the targeted media provided on behalf of advertisers as a fee based service.

3. The method of claim 2 wherein receiving the outgoing communication further comprises:
intercepting the outgoing communication, the outgoing communication placed on a particular transport service; and
completing the outgoing communication on an alternative transport service, such that the destination of the intended recipient is independent of a transport service invoked by the initiating user for transporting the outgoing communication, the communication being completed on the alternative transport service.

4. The method of claim 3 wherein intercepting further comprises:
identifying an interception point, the interception point being a switching point disposed for intercepting the outgoing communication prior to incurring fees from the invoked transport service; and
invoking an alternate network for providing the identified transport service, the invoked alternate network providing the transport service and the targeted media, the targeted media provided as a revenue generator supporting invocation of the alternate network.

5. The method of claim 1 further comprising:
providing an overriding option to the initiating user, the overriding option suppressing transmission of the targeted media; and
collecting a fee from the user in return for the overriding option to avoid receiving the targeted media.

6. The method of claim 1 wherein the targeted media emanates from a social networking website, further comprising:
identifying a social networking site corresponding to the identified recipient;
retrieving, from a personal greeting repository at the social networking website, recipient specific entries, the recipient specific entries responsive to realtime updates from the recipient;
selecting, as the targeted media for providing to the initiating user, the recipient specific entries posted by the recipient.

7. The method of claim 1 wherein the connection interval corresponds to a ringback, the media selections replacing a ringback tone delivered during the ringback.

8. The method of claim 2 further comprising referencing a user repository, the user repository storing user attributes for a plurality of users, the user attributes applicable to a plurality of different transport mediums for a particular user, the user repository including initiator attributes corresponding to the user attributes of the initiating user and recipient attributes corresponding to the user attributes of the intended recipient.

9. The method of claim 1 further comprising deploying a plurality of switching devices, each of the switching devices interfacing with a public transport network proximate to the users, each of the switching devices having an interface to a media database for identifying targeted media and an interface to the user repository for identifying user attributes corresponding to the initiating user and the recipient user.

10. The method of claim 1 wherein selecting the targeted media further comprises:
retrieving user attributes indicative of demographics of the user; and
invoking media rules correlating the retrieved user attributes to media selections of interest based on the demographics of the user.

11. A network switching appliance for providing a communication service comprising:
an interface to a default network for receiving an outgoing communication from an initiating user;
a registration database for identifying user attributes corresponding to the initiating user;
a service selector for determining, from the outgoing communication, a destination for the communication, the destination indicative of an intended recipient, the service selector further identifying, based on device information in the identified user attributes and the intended recipient, at least one transport service available on behalf of the initiating user for transporting the outgoing communication, the identified transport service denoting a communication medium for completing the outgoing communication, the service selector further performing:
identifying device information in user attributes corresponding to the intended recipient
matching the identified device information from the user attributes corresponding to the initiating user with the identified device information of the intended recipient; and
computing, from the matching, a transport service for completing the communication, the transport service providing a communication medium accessible to both the initiating user and the intended recipient; and a media interface to a media database, the media interface responsive to media rules for selecting, prior to completing the communication using the identified transport service, based on the user attributes, targeted media for delivery to the initiating user, selecting further comprising selecting the targeted media from the media database based on an anticipated responsiveness of the initiating user, the anticipated responsiveness including goods and services for which the user is deemed to be likely to undertake based on circumstances computed from origination of the message, the circumstances including at least one of location, recent messages, user income, or recent purchases, the media rules defining selection of the targeted media during a connection interval while accessing the identified transport service, the selection performed:

using media rules based on circumstances computed from origination of the message, and sending the selected targeted media to the initiating user before completing the communication;

the media rules further configured for:

retrieving user attributes corresponding to the initiating user from a user registration database;

indexing, based on the retrieved user attributes, the media database to identify at least one record indicative of the anticipated responsiveness of the user; and computing a correlation between the user attributes and media entries in the media database; and identifying media entries having a high correlation as the targeted media for delivery to the initiating user.

12. The network appliance of claim 11 wherein selecting the targeted media further comprises:

retrieving user attributes indicative of demographics of the user; and invoking media rules correlating the retrieved user attributes to media selections of interest based on the demographics of the user.

13. A computer program product on a non-transitory computer readable storage medium including a set of processor based instructions that, when executed by a processor in a computer responsive to the instructions, cause the computer to perform a method of providing communications services, comprising:

receiving an outgoing communication from an initiating user;

identifying user attributes corresponding to the initiating user;

determining, from the outgoing communication, a destination for the communication, the destination indicative of an intended recipient;

identifying, based on device information in the identified user attributes and the intended recipient, at least one transport service available on behalf of the initiating user for transporting the outgoing communication;

matching the identified device information from the user attributes corresponding to the initiating user with user attributes of the recipient;

computing, from the matching, a transport service for completing the communication, the transport service providing a communication medium accessible to both the initiating user and the intended recipient;

prior to completing the communication using the identified transport service, selecting, based on the user attributes, targeted media for delivery to the initiating user;

further comprising, during a connection interval defined by intercepting the communication and completing the communication:

retrieving the user attributes corresponding to the initiating user;

indexing a repository of targeted media to retrieve media selections corresponding to the user attributes, indexing the repository of targeted media further including:

identifying computed attributes and stored attributes, the computed attributes generated upon evaluation and the stored attributes retrieved from the user database; and authenticating, using the stored attributes, the identify of the initiating user for subsequent payment authorization responsive to the targeted media;

presenting the indexed media selections to the initiating user; and receiving interactive user selections based on the presented media selections.

14. The method of claim 1 further comprising identifying a universal identifier for identifying the user attributes and transport services available to the initiating user and the intended recipient, universal identifier.

15. The method of claim 1 wherein matching further comprises selecting an optimal transport service such that the optimal transport service has a lowest resource cost from among transport services common to the initiating user and the intended recipient.

16. The method of claim 1 wherein the user registration database indexes based on a universal identifier for communication between an initiator and recipient, the user registration database providing an underlying infrastructure for matching initiators to recipients.

\* \* \* \* \*